United States Patent
Ungerecht et al.

(10) Patent No.: US 8,678,029 B2
(45) Date of Patent: Mar. 25, 2014

(54) PRESSURE REGULATOR WITH REMOTELY CONTROLLED SHUT-OFF VALVE

(75) Inventors: Cliff P. Ungerecht, Walla Walla, WA (US); Lee A. Perkins, Lowden, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 245 days.

(21) Appl. No.: 13/105,620

(22) Filed: May 11, 2011

(65) Prior Publication Data

US 2012/0285557 A1  Nov. 15, 2012

(51) Int. Cl.
| F16K 31/12 | (2006.01) |
| F16K 31/36 | (2006.01) |
| F16K 31/14 | (2006.01) |
| F16K 31/00 | (2006.01) |

(52) U.S. Cl.
USPC .......................... 137/505.25; 137/495; 251/61

(58) Field of Classification Search
USPC ............. 251/61, 61.2, 61.4; 137/505.25, 495, 137/505.28
See application file for complete search history.

(56) References Cited

U.S. PATENT DOCUMENTS

| 3,692,047 | A | * | 9/1972 | Camp | ........................... 137/495 |
| 6,374,853 | B1 | | 4/2002 | Callies | |
| 6,752,169 | B2 | | 6/2004 | Callies | |
| 6,923,205 | B2 | | 8/2005 | Callies | |
| 7,140,595 | B2 | | 11/2006 | Youngberg et al. | |
| 7,628,910 | B2 | | 12/2009 | Lockwood | |
| 2004/0003848 | A1 | * | 1/2004 | Callies | ..................... 137/505.25 |
| 2010/0038450 | A1 | * | 2/2010 | Sesser et al. | ............. 239/222.17 |

OTHER PUBLICATIONS

U.S. Appl. No. 13/045,814, filed Mar. 11, 2011. Pending.

* cited by examiner

*Primary Examiner* — John K Fristoe, Jr.
*Assistant Examiner* — Michael R Reid
(74) *Attorney, Agent, or Firm* — Nixon & Vanderhye P.C.

(57) ABSTRACT

A pressure regulator includes a housing assembly defining a main fluid flow path from an inlet end to an outlet end. A tubular plunger body is supported within the housing assembly for linear movement toward and away from a valve seat in response to fluid pressure at said outlet end. An actuator sleeve is supported within the housing assembly and engaged with the tubular plunger body, and a pressure chamber defined in part by a shut-off diaphragm extends between the housing assembly and the actuator sleeve. A fluid port is arranged to supply pressurized fluid to the pressure chamber to thereby produce linear movement of the actuator sleeve and the tubular plunger body independent of the pressure at said outlet end, moving the tubular plunger body into engagement with the valve seat to shut off the flow path.

21 Claims, 2 Drawing Sheets

PRESSURE REGULATOR WITH REMOTELY CONTROLLED SHUT-OFF VALVE

BACKGROUND OF THE INVENTION

This invention relates to valves and pressure regulators generally, and specifically to a fluid pressure regulator particularly suited for (but not limited to) use in agricultural irrigation systems.

It is well known to use pressure regulators in irrigation systems in order to provide substantially constant, regulated outlet pressure over a wide range of regulator inlet pressures, to thereby insure the supply of water is maintained at a substantially uniform pressure to a sprinkler or other irrigation device. The need for such regulators is particularly acute in low pressure systems because even slight variations in pressure along a system operating at low pressure causes much greater variations and discharges than the same system operating at high pressure.

The assignee of this invention currently manufactures and sells fluid pressure regulators of the flow-through type, having an inlet at one end of a tubular housing and an outlet at the other end of the tubular housing. A valve or regulator seat is fixed within the housing and is adapted to be engaged by a tubular plunger which is spring biased away from the seat (in the direction of fluid flow) so that under normal conditions, maximum flow through the regulator is permitted. In the event of a pressure surge, the plunger is moved by back pressure within a diaphragm chamber, against the action of an opposed coil spring (and against atmospheric pressure), toward the regulator seat to thereby decrease flow through the regulator until the pressure is reduced, at which point the plunger will stop or, if pressure decreases sufficiently, move upwardly away from the seat to thereby increase the flow. In this way, the plunger constantly seeks an equilibrium position within the regulator to maintain a substantially uniform outlet pressure.

It would be advantageous to incorporate a remotely controlled shut-off feature in pressure regulators as described above in order to, for example, facilitate repair/replacement of downstream sprinklers or other components, and/or to turn some sprinklers on and off at various times in an automatic multi-sprinkler system to implement desired sprinkling patterns.

BRIEF SUMMARY OF THE INVENTION

In one exemplary but nonlimiting embodiment, the invention provides a pressure regulator comprising a housing assembly defining a fluid flow path from an inlet end to an outlet end; a tubular plunger body supported within the housing assembly for linear movement toward and away from a valve seat in response to fluid pressure at the outlet end; an actuator sleeve supported within the housing assembly and engaged with the tubular plunger body; a pressure chamber defined in part by a shut-off diaphragm extending between the housing assembly and the actuator sleeve; a fluid port arranged to supply pressurized fluid to the pressure chamber to thereby produce linear movement of the actuator sleeve and the tubular plunger body independent of the pressure at the outlet end, moving the tubular plunger body into engagement with the valve seat to shut off the flow path.

In another exemplary but nonlimiting aspect, the invention provides a pressure regulator comprising a housing assembly defining a fluid flow path from an inlet end to an outlet end, the housing assembly including a housing body and a cap secured to the lower housing body; a tubular plunger body supported within the lower housing body and the cap for linear movement toward and away from a valve seat supported in the housing body in response to fluid pressure at the outlet end; an actuator sleeve supported within the housing body and adapted to engage the tubular plunger body; and fluid means for driving the tubular plunger body linearly to close off all flow through the housing assembly independent of the fluid pressure at the outlet end.

In still another exemplary but nonlimiting aspect, the invention provides a pressure regulator comprising a housing assembly defining a fluid flow path from an inlet end to an outlet end; a tubular plunger body supported within the housing assembly for linear movement toward and away from a valve seat in response to fluid pressure at the outlet end; a control diaphragm supported radially between the tubular plunger body and the housing assembly, wherein the control diaphragm is exposed on one side to the fluid pressure at the outlet end to thereby exert a force on the tubular plunger body in a direction toward the valve seat; a shut-off extending between the housing assembly and the actuator sleeve partially defining a pressure chamber; and a fluid port arranged to supply pressurized fluid to the pressure chamber to thereby produce linear movement of the actuator sleeve and the tubular plunger body independent of the pressure at the outlet end, moving the tubular plunger body into engagement with the valve seat to a closed position, shutting off the flow path.

An exemplary but nonlimiting embodiment will now be described in detail in connection with the drawings identified below.

DETAILED DESCRIPTION OF THE DRAWINGS

Figure 1:
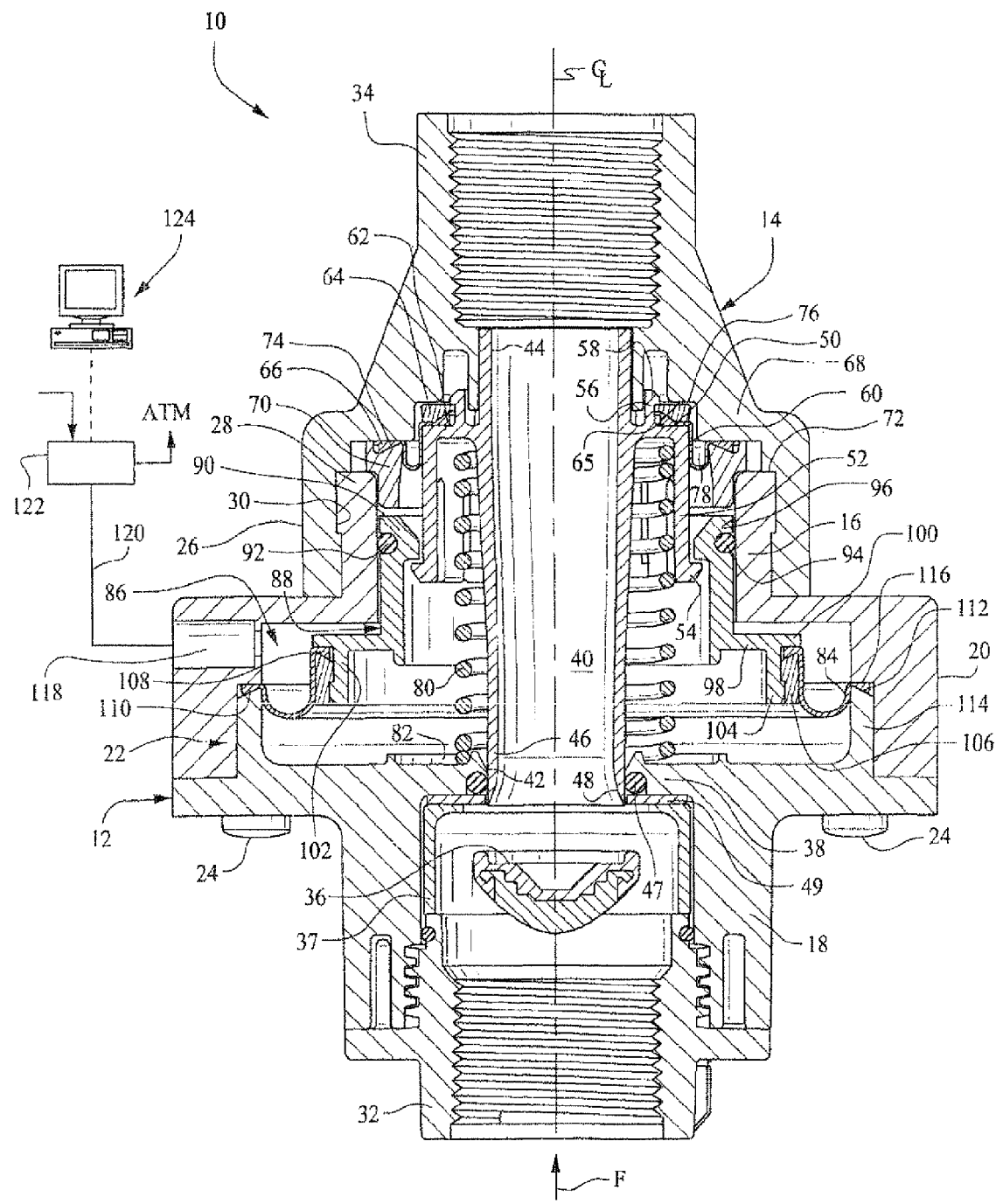
FIG. 1 is a cross section of a pressure regulator in accordance with a first exemplary embodiment of the invention, with a remotely-operated shut-off feature shown in an open-position.
Figure 2:
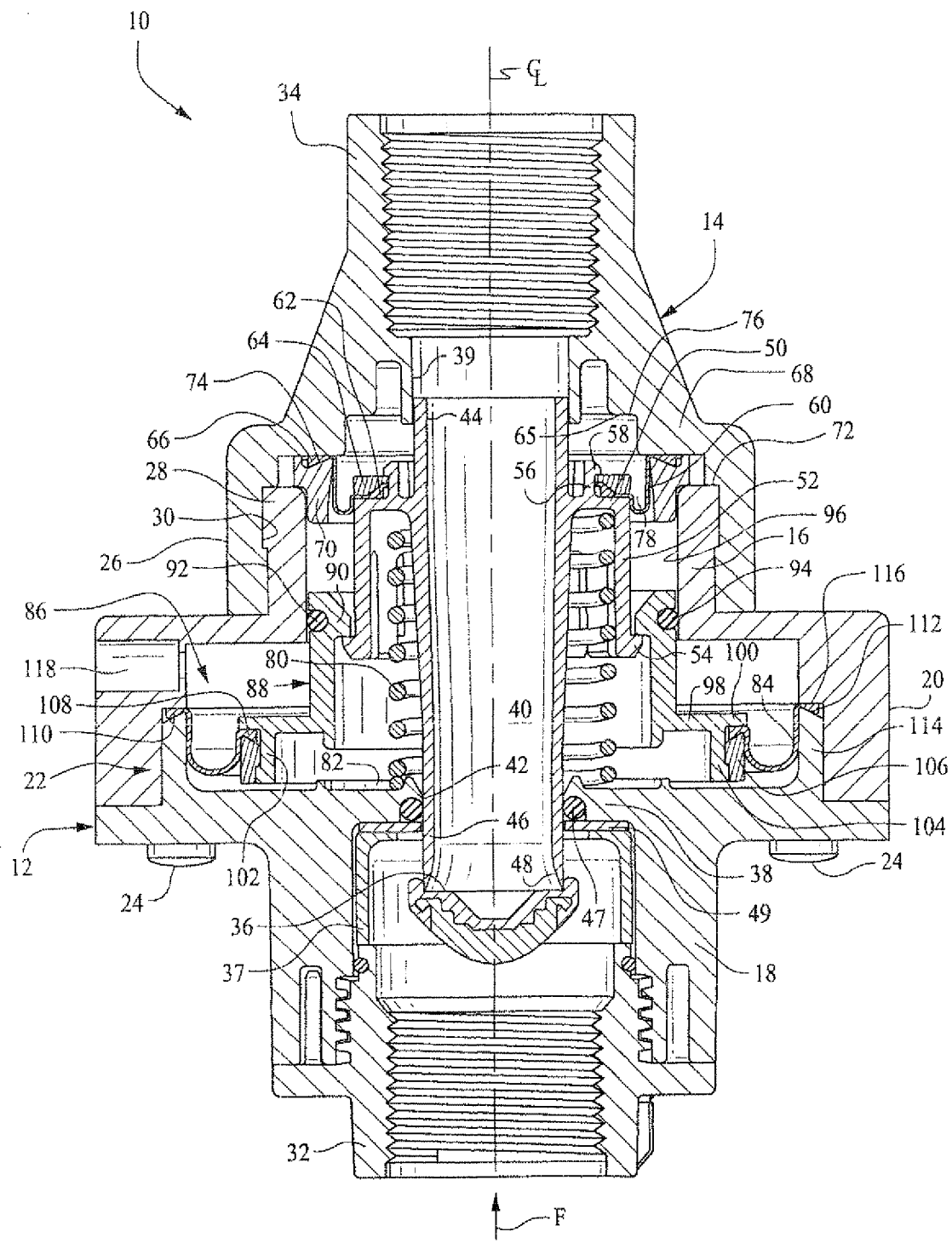
FIG. 2 is a cross section similar to FIG. 1 but showing the remotely-operated shut-off feature in a closed position.

The pressure regulator 10 shown in FIGS. 1 and 2 includes a housing assembly formed by the attachment of a two-piece housing body 12 and a cap 14. The housing body 12 is a hollow, annular component formed with upper and lower, open, cylindrical ends (or downstream and upstream ends, respectively) 16, 18 on either side of a larger-diameter middle section 20 where the upper and lower ends 16, 18 are joined in telescoping fashion at 22 and secured by screws 24 or other suitable fasteners. For ease of understanding, use of descriptors "upper" and "lower" herein are made consistently with the exemplary but nonlimiting orientation of the pressure regulator as shown in FIGS. 1 and 2. Use of descriptors "upstream" and "downstream" is made relative to the direction of flow through the pressure regulators as indicated by flow arrow "F".

The downstream end 16 as housing body 12 is also telescoped into a depending skirt portion 26 of the cap 14 with a snap fit between a radially-outwardly directed annular flange 28 (continuous or segmented) on the outside of the downstream end 16 and an annular groove 30 located internally of the skirt portion 26 of the cap 14. It will be appreciated, however, the attachment features on the downstream end 16 and skirt portion 26 may include any conventional attachment mechanism including a press-and-turn bayonet-type fitting, screw fasteners or other suitable arrangements. Moreover, the exact manner of fastening the cap 14 to the downstream end 16 of the housing body 12, and the downstream end 16 of the housing body 12 to the upstream end 18 are not significant to this invention so long as they are designed to withstand the high fluid pressure within the regulator unit. The upstream or lower end 18 of the housing body 12 is formed with a threaded inlet that receives, for example, an adapter 32 permitting attachment of the pressure regulator to a water-supply conduit, sprinkler riser or the like. Similarly, the cap 14 tapers from the relatively larger diameter peripheral skirt portion 26 to an internally-threaded and relatively smaller-diameter outlet end or outlet 34, adapted for connection to a water supply conduit, drop hose or the like. It will be understood that the regulator flow path extends along a longitudinal axis or center line CL passing through the inlet (or adapter) 32, a tubular plunger body 40 described further below, and the outlet 34.

A valve seat 36 is supported in the upstream end 18 of the housing body 12 below an annular flange 38, and centered relative to the longitudinal axis. The seat 36 is preferably supported by a single radially-oriented strut (not shown) connected to the cylindrical valve housing 37, and is engageable by a tubular plunger body 40 that passes through a center opening 42 defined by the annular flange 38 in the lower end 18 of the lower housing body 12 and a counterbore 39 (FIG. 2) in the cap 14.

The elongated tubular plunger body 40 is formed with an upper end 44 and a lower end 46. The lower end 46 is formed with a tapered knife edge 48 that serves as a valve, adapted to engage the seat 36 as explained further below. An O-ring seal 47 is seated about the inner periphery of the opening in the annular flange 38 and is held in place by a retainer ring 49. The seal 47 prevents ingress of water into the interior of the housing body.

An annular radial flange 50 is formed at a location below the upper end 44 of the plunger body 40. The flange 50 is formed with a plurality of depending, resilient spring fingers 52 arranged about the tubular plunger body 40, each having a radially outwardly extending support tab 54 at its lowermost end.

The radial flange 50 also supports an upstanding annular wall 56 located concentrically and radially outwardly relative to the plunger body 40. The wall 56 is formed with a radially outwardly extending rim 58. The wall 56 and rim 58 may be discontinuous, i.e., formed as plural, circumferentially-spaced resilient segments.

A control or pressure-regulating diaphragm 60 is arranged radially between the tubular plunger body 40 and the cap 14. Specifically, an enlarged radially inner end 62 of the diaphragm 60 is sandwiched between an annular retention ring 64 and the flange 50. The retention ring 64 is held in place by the rim 58 of the upstanding annular wall 56 and by a shoulder 65 of the cap 14. The radially outer end 66 of the diaphragm is sandwiched between a radial flange portion 68 of the cap 14 and a second annular retention ring 70 held in place by the upper edge 72 of the downstream end 16 of the housing body 12. The second annular retention ring 70 is provided with an annular groove 74 in which the enlarged radially outer end 66 of the diaphragm is received.

During operation, the pressure of the water flowing in the direction of flow arrow F through the tubular plunger body 40 and exiting the outlet end 34 will be applied to the upper or downstream side of the control diaphragm 60 by way of a radial space between the upper end 44 of the tubular plunger body 40 and the adjacent counterbore 39 formed in the cap 14. The water is able to follow a path about the annular wall 56 and one or more radial grooves or vents (not shown) in the ring 64 (and/or in the shoulder 76) into the control diaphragm chamber 78. Water pressure in the control diaphragm chamber 78 will tend to push the tubular plunger body 40 in a downward direction, causing the knife edge 48 to approach the valve seat 36, thus reducing flow. The force exerted on the tubular plunger body 40 via the control diaphragm 60 is opposed by a force exerted by a coil spring 80 seated on the upper surface 82 of flange 38, and pushing upwardly against the underside of the plunger body radial flange 50. Thus, as is well understood in the art, as outlet water pressure varies, the tubular plunger body 40 will be caused to move toward or away from the seat 36 to thereby decrease or increase flow through the regulator, with the plunger body 40 always seeking a state of equilibrium where the outlet pressure is substantially constant.

This invention relates to the addition of a remote shut-off feature to the pressure regulator 10 that allows a user to stop flow through the pressure regulator independently of the pressure regulation function from a remote location.

Specifically, the larger-diameter middle section 20 permits the inclusion of a second or shut-off diaphragm 84 and associated shut-off diaphragm chamber 86 (sometimes referred to herein as a "pressure chamber") that enable a remote device, such as a solenoid (under the control of a microprocessor or other control device) to shut off the pressure regulator independently of its primary pressure control function. To this end, an interior, substantially cylindrical actuator sleeve 88 is supported from the support tabs 54 of the spring fingers 52. The upper end of the sleeve 88 is formed with an inward directed rim 90 that is seated on the tabs 54. Radially adjacent the rim 90, an O-ring 92 is seated in an annular, outwardly-facing groove 94, creating a seal between the sleeve 88 and the inside surface 96 of the downstream end 16 of the housing body 12. Adjacent the lower end of the sleeve 88 there is an outwardly-directed flange 98, supporting a larger-diameter, depending skirt 102. The lower end of the skirt 102 is formed with an outwardly-oriented shoulder 104. A second retention ring 106 is supported on the shoulder 104 and serves to clamp a radially-inner end 108 of the shut-off diaphragm 84 between the retention ring 106 and the outer edge 100 of flange 98. The radially-outer end 110 of the shut-off diaphragm 84 is held in place by the compressive force exerted by the edge 112 of an inner sleeve portion 114 of the upstream end 18 of the housing body 12 and an opposed shoulder 116 of the downstream end 16 of the lower housing body 12. Note the chamfer on edge 112 that provides the space necessary to accommodate the wedge-shaped inner end of the shut-off diaphragm 84.

The space above the shut-off diaphragm 84 provides the shut-off diaphragm chamber 86, sealed at one end by the shut-off diaphragm 84 and at an opposite end by the O-ring 92. A fluid (water or air) inlet port 118 leading to the shut-off diaphragm chamber 86, extends through the downstream end 16 in the middle section 20, and supplies pressurized fluid to the chamber 86 via conduit 120 (FIG. 1). The flow of pressurized fluid is controlled by a three-way solenoid 122 which, in turn, is controlled by a processor or other controller 124. The three-way solenoid 122 has three ports. One is connected to the chamber 86; one is vented to atmosphere; and the third is connected to a pressurized fluid source.

When it is desired to shut off flow through the pressure regulator 10, the user initiates the supply of pressurized fluid to the pressure chamber 86. The fluid pressure acting on the flange 98 drives the actuator sleeve 88 and tubular plunger body 40 downwardly until the knife edge 48 engages the seat 36, thereby shutting off all flow through the regulator as shown in FIG. 2. Note that the connection between the rim 90 of the actuator sleeve 88 and the tabs 54 on the spring fingers 52 form a one-way driving connection between the actuator sleeve 88 and the tubular plunger body 40.

To resume flow, the solenoid 122 is vented to atmosphere, allowing fluid to escape the pressure chamber 86 as the coil spring 80 pushes the tubular plunger body 40 in an opposite or upward direction, also pulling the actuator sleeve 88 upwardly to the position shown in FIG. 1. Absent pressure in the chamber 86, the driving connection between the actuator sleeve 88 and the tubular plunger body 40 is broken. This is because there is no fixed connection between the actuator sleeve 88 and the plunger body 40, and because the actuator sleeve 88 will remain in its upper or open position as the tubular plunger body 40 moves down and up in response to the fluid pressure in the control diaphragm chamber 78.

It will be appreciated that the downward axial movement of the tubular plunger body 40 in a valve shut-off procedure is limited by the downward stroke of the actuator sleeve 88. This downward stroke is matched to the closing distance between the knife edge 48 of the plunger body 40 and the valve seat 36.

It will also be appreciated that as the tubular plunger body 40 moves up and down during normal use, and with the actuator sleeve 88 held in its open or uppermost position, there is no interference with the pressure regulation function.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pressure regulator comprising:
a housing assembly defining a main fluid flow path from an inlet end to an outlet end;
a tubular plunger body supported within said housing assembly for linear movement toward and away from a valve seat in response to fluid pressure at said outlet end;
a first pressure chamber defined in part by a control diaphragm extending between said housing assembly and said tubular plunger body;
an actuator sleeve supported within said housing assembly and engaged with said tubular plunger body;
a second pressure chamber defined in part by a shut-off diaphragm extending between said housing assembly and said actuator sleeve;
a fluid port arranged to supply pressurized fluid to said second pressure chamber to thereby produce linear movement of said actuator sleeve to engage and drive said tubular plunger body independent of the pressure at said outlet end, into engagement with said valve seat to shut off said flow path, and wherein when said actuator sleeve is in a valve-open position, said tubular plunger body is free to disengage and move toward or away from said actuator sleeve and said valve seat solely in response to fluid pressure at said outlet end.

2. The pressure regulator of claim 1 wherein, upon evacuation of pressurized fluid from said second pressure chamber, a spring located within said housing assembly causes reverse movement of said actuator sleeve and tubular plunger body away from said valve seat to thereby open said main fluid flow path.

3. The pressure regulator of claim 1 wherein said tubular plunger body is spring-biased in a direction away from said valve seat.

4. The pressure regulator of claim 1 wherein said control diaphragm is exposed on one side to the fluid pressure at said outlet end to thereby exert a force on said tubular plunger body in a direction toward said valve seat.

5. The pressure regulator of claim 1 wherein said housing assembly includes a housing body comprised of upstream and downstream ends on either side of a larger-diameter middle section, and wherein an annular seal is located between an upper end of said actuator sleeve and said downstream end of said housing body.

6. The pressure regulator of claim 4 wherein said tubular plunger body is provided with plural, axially-extending spring fingers in an annular array, said plural, axially-extending spring fingers formed with respective radially outwardly extending support tabs at free ends thereof, said actuator sleeve formed at its upper end with an annular rim engageable with said radially outwardly extending support tabs.

7. The pressure regulator of claim 1 wherein said housing assembly comprises a lower housing body and a cap, said cap having a threaded portion at said outlet end, and an internal annular wall receiving an upper end of said tubular plunger body.

8. The pressure regulator of claim 6 wherein said housing assembly comprises a lower housing body and a cap, said cap having a threaded portion at said outlet end, and an internal annular wall receiving an upper end of said tubular plunger body, a radial flange extending from said tubular plunger body, with said plural, axially-extending spring fingers extending downwardly from said radial flange.

9. The pressure regulator of claim 8 wherein a radially inner end of said control diaphragm is held in place by an annular retention ring; said radial flange formed with an annular upstanding wall, terminating at a radially outwardly extending rim at an upper end thereof, said rim engaged with said retention ring.

10. A pressure regulator comprising:
a housing assembly defining a fluid flow path from an inlet end to an outlet end, said housing assembly including a housing body and a cap secured to said housing body;
a tubular plunger body supported within said housing body and said cap for linear movement toward and away from a valve seat supported in said housing body in response to fluid pressure at said outlet end;
an actuator sleeve supported for linear movement within said housing body in two opposite directions, and adapted to engage and drive said tubular plunger body in only one of said two opposite directions toward said valve seat; and fluid means for driving said actuator sleeve and said tubular plunger body linearly in said one direction to close off all flow through said housing assembly independent of the fluid pressure at said outlet end; said actuator sleeve arranged to disengage said tubular plunger body when the actuator sleeve is in a valve-open position.

11. The pressure regulator of claim 10 wherein said tubular plunger body is spring-biased in the other of said two opposite directions, away from said valve seat.

12. The pressure regulator of claim 11 wherein a control diaphragm is supported radially between said tubular plunger body and said cap, and wherein said diaphragm is exposed on one side to fluid pressure at said outlet end to thereby exert a force on said tubular plunger body in said one of two opposite directions, toward said valve seat.

13. The pressure regulator of claim 10 wherein said fluid means is controlled remotely from the pressure regulator.

14. The pressure regulator of claim 10 wherein said tubular plunger body is provided with plural, axially-extending spring fingers in an annular array, said plural, axially-extending spring fingers formed with respective radially outwardly extending tabs at free ends thereof; said actuator sleeve formed at its upper end with an annular rim engageable with said radially outwardly extending tabs, said actuator sleeve providing a surface acted upon by fluid pressure exerted by said fluid means.

15. The pressure regulator of claim 14 wherein a shut-off diaphragm extends between said actuator sleeve and said housing body.

16. The pressure regulator of claim 15 wherein said housing body comprises upstream and downstream sections, said shut-off diaphragm held in place at one end by a retention ring engaged with said actuator sleeve and at an opposite end by a compression fit between joined portions of said housing body.

17. A pressure regulator comprising:
- a housing assembly defining a fluid flow path from an inlet end to an outlet end;
- a tubular plunger body supported within said housing assembly for linear movement toward and away from a valve seat in response to fluid pressure at said outlet end;
- a control diaphragm supported radially between said tubular plunger body and said housing assembly partially forming a first pressure chamber, wherein said control diaphragm is exposed on one side to the fluid pressure at said outlet end to thereby exert a force on said tubular plunger body in a direction toward said valve seat;
- an actuator sleeve supported within said housing assembly for linear movement in two opposite directions, and adapted to engage said tubular plunger body in a one-way drive arrangement;
- a shut-off diaphragm extending between said housing assembly and said actuator sleeve partially defining a second pressure chamber; and
- a fluid port arranged to supply pressurized fluid to said second pressure chamber to thereby produce linear movement of said actuator sleeve and said tubular plunger body independent of the pressure at said outlet end, driving said tubular plunger body into engagement with said valve seat to a closed position, shutting off said flow path, and wherein, when said actuator sleeve is in a valve-open position, said tubular plunger body is free to disengage said actuator sleeve and to move toward or away from said valve seat and said actuator sleeve solely in response to fluid pressure at said outlet end.

18. The pressure regulator of claim 17 wherein, upon evacuation of pressurized fluid from said second pressure chamber, a spring located within said housing assembly causes reverse movement of said actuator sleeve and tubular plunger body away from said valve seat to thereby open said main fluid flow path.

19. The pressure regulator of claim 17 wherein said tubular plunger body is spring-biased in a direction away from said valve seat.

20. The pressure regulator of claim 17 wherein said housing assembly includes a housing body comprised of upstream and downstream ends on either side of a larger-diameter middle section, and wherein an annular seal is located between an upper end of said actuator sleeve and said downstream end of said housing body.

21. The pressure regulator of claim 17 wherein said tubular plunger body is provided with plural, axially-extending spring fingers in an annular array, said plural, axially-extending spring fingers formed with respective radially outwardly extending support tabs at free ends thereof, said actuator sleeve formed at its upper end with an annular rim engageable with said radially outwardly extending support tabs.

* * * * *